United States Patent
Saddoughi

(10) Patent No.: US 7,198,234 B2
(45) Date of Patent: Apr. 3, 2007

(54) METHOD AND APPARATUS FOR MODULATING FLOW SEPARATION

(75) Inventor: Seyed Gholamali Saddoughi, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 33 days.

(21) Appl. No.: 11/029,713

(22) Filed: Jan. 5, 2005

(65) Prior Publication Data

US 2006/0102800 A1 May 18, 2006

Related U.S. Application Data

(62) Division of application No. 10/202,534, filed on Jul. 24, 2002, now Pat. No. 6,869,049.

(51) Int. Cl.
B64C 21/04 (2006.01)
(52) U.S. Cl. ............................ 244/207; 60/243; 60/761
(58) Field of Classification Search ........ 244/207–209; 60/262, 265, 243, 761
See application file for complete search history.

(56) References Cited

U.S. PATENT DOCUMENTS

| 1,854,043 | A | * | 4/1932 | Korner ........................ 244/203 |
| 2,376,834 | A | * | 5/1945 | Thompson ................... 244/12.1 |
| 2,783,008 | A | * | 2/1957 | Bodine, Jr. .................. 244/130 |
| 3,262,658 | A | | 7/1966 | Reilly |
| 4,947,644 | A | | 8/1990 | Hermant |
| 5,428,951 | A | | 7/1995 | Wilson et al. |
| 5,758,823 | A | | 6/1998 | Glezer et al. |
| 5,894,990 | A | | 4/1999 | Glezer et al. |
| 5,957,413 | A | | 9/1999 | Glezer et al. |
| 6,203,269 | B1 | | 3/2001 | Lorber et al. |
| 6,412,732 | B1 | | 7/2002 | Amitay et al. |
| 6,543,719 | B1 | * | 4/2003 | Hassan et al. ........... 244/17.13 |
| 6,554,607 | B1 | | 4/2003 | Glezer et al. |

OTHER PUBLICATIONS

R. Funk et al., "Transient Separation Control Using Pulse Combustion Actuation." American Institute of Aeronautics and Astronautics, 1st Flow Conference, St. Louis, Mo, Jun. 2002, pp. 1-9.
US Patent Application titled, "Method and Aparatus for Modulating Airfoil Lift," S. Saddought, et al.
R. Funk et al., "Transient Separation Using Pulse Combustion Actuation" AIAA Shear Flow Control Conference, vol. AIAA 2002-3166, Jun. 24, 2002, pp. 1-9.
EP 03254504 Search Report, Sep. 7, 2005.

* cited by examiner

Primary Examiner—Galen Barefoot
(74) Attorney, Agent, or Firm—Richard A. DeCristofaro; Patrick K. Patnode

(57) ABSTRACT

An apparatus comprising: an aerodynamic surface adapted for producing an adverse pressure gradient in a fluid flow; and a first pulse detonation actuator disposed adjacent the aerodynamic surface and adapted for impulsively detonating a fuel/air mixture to produce a pressure rise and velocity increase of combustion products therein, the aerodynamic surface having a plurality of separation control holes adapted for communicating combustion product flows from the first pulse detonation actuator to the aerodynamic surface for modulating separation of the fluid flow from the aerodynamic surface.

5 Claims, 1 Drawing Sheet

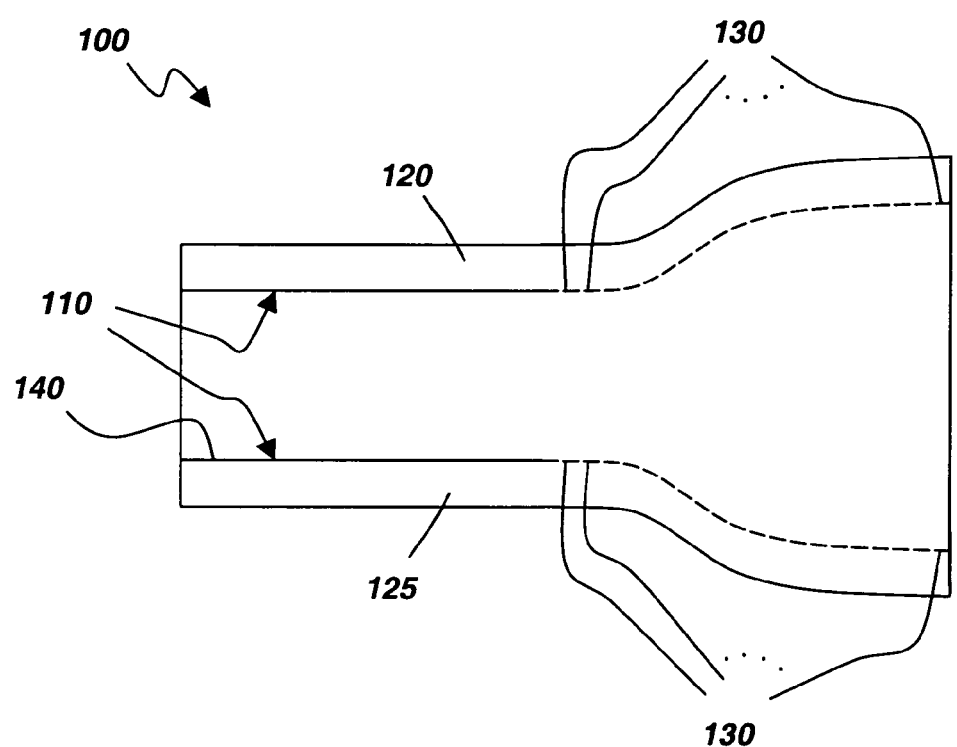

METHOD AND APPARATUS FOR MODULATING FLOW SEPARATION

This application is a division of application Ser. No. 10/202,534, filed Jul. 24, 2002 now U.S. Pat. No. 6,869,049, which is hereby incorporated by reference in its entirety.

BACKGROUND

The present invention relates generally to the field of modulating flow separation and more specifically to the use of a pulse detonation actuator (PDA) for injecting fluid into a boundary layer of an aerodynamic surface.

In a wide variety of applications, aerodynamic surfaces are used to manipulate the speed and pressure of moving fluids. Examples of aerodynamic surfaces include, but are not limited to, airfoils and channel surfaces. Examples of airfoils include, without limitation: aircraft wings; rotor blades for propellers, fans, compressors, turbines, helicopters, and other rotorcraft; and stator vanes for compressors and turbines. Examples of channel surfaces include, without limitation, diffusers for gas turbine engines.

Many aerodynamic surfaces are designed to create an adverse pressure gradient, i.e., a region wherein pressure increases along the direction of flow. Such an adverse pressure gradient may cause the fluid boundary layer to separate from the aerodynamic surface thereby reducing the efficacy of the design.

One strategy for reducing the tendency toward boundary layer separation is to inject fluid into the boundary layer through jets in the aerodynamic surface. Typically, the effectiveness of this strategy increases as the velocity of the injected fluid approaches the velocity of the bulk fluid flow. Conversely, applicability of the strategy is conventionally limited by the pressure rise and velocity increase for fluid injection producible by conventional means.

A pulse detonation actuator (PDA) provides a means for creating a pressure rise and velocity increase greater, in some applications, than the pressure rise and velocity increase available for boundary layer fluid injection by conventional means. Opportunities exist, therefore, to broaden the applicability of boundary layer fluid injection through the use of PDAs.

SUMMARY

The opportunities described above are addressed in one embodiment of the present invention by an apparatus comprising: an aerodynamic surface adapted for producing an adverse pressure gradient in a fluid flow; and a first pulse detonation actuator disposed adjacent the aerodynamic surface and adapted for impulsively detonating a fuel/air mixture to produce a pressure rise and velocity increase of combustion products therein, the aerodynamic surface having a plurality of separation control holes adapted for communicating combustion product flows from the first pulse detonation actuator to the aerodynamic surface for modulating separation of the fluid flow from the aerodynamic surface.

DRAWINGS

These and other features, aspects, and advantages of the present invention will become better understood when the following detailed description is read with reference to the accompanying drawings in which like characters represent like parts throughout the drawings, wherein:

The FIGURE illustrates an orthographic projection of an apparatus in accordance with one embodiment of the present invention.

DETAILED DESCRIPTION

In accordance with one embodiment of the present invention, the FIGURE illustrates an orthographic projection of an apparatus 100 that includes an aerodynamic surface 110 and a first pulse detonation actuator 120. In operation, aerodynamic surface 110 produces an adverse pressure gradient in a fluid flow. First pulse detonation actuator 120 extends along aerodynamic surface 110 and impulsively detonates a fuel/air mixture to produce a pressure rise and velocity increase of combustion products therein. For modulating separation of the fluid flow, aerodynamic surface 110 has a number of separation control holes 130 for communicating combustion product flows from first pulse detonation actuator 120 to aerodynamic surface 110.

As used herein, a "pulse detonation actuator" is understood to mean any device or system which produces both a pressure rise and velocity increase from a series of repeating detonations or quasi-detonations within the device. A "quasi-detonation" is a combustion process which produces a pressure rise and velocity increase higher than the pressure rise and velocity increase produced by a deflagration wave. Typical embodiments of PDAs comprise a means of igniting a fuel/air mixture, and a detonation chamber in which pressure wave fronts initiated by the ignition process coalesce to produce a detonation wave. The geometry of the detonation chamber is such that the pressure rise of the detonation wave expels combustion products out the PDA exhaust. As used herein, "impulsively detonating" refers to a process of repeating detonations or quasi-detonations wherein each detonation or quasi-detonation is initiated either by external ignition (for example, without limitation, spark discharge or laser pulse) or by gas dynamic processes (for example, without limitation, shock initiation or autoignition).

In a more detailed embodiment in accordance with the embodiment of the FIGURE, separation control holes 130 are shaped to promote attachment of the boundary layer to airfoil surface 140 so that separation is a decreasing function of the combustion product flows. Decreasing the tendency toward separation is useful in increasing the lift of airfoil surfaces and in decreasing the wake produced by some surfaces.

In an alternative embodiment, lift control holes 130 are shaped to promote separation of the boundary layer from airfoil surface 140 so that separation is an increasing function of the combustion product flows. Increasing the tendency toward separation is useful in some nozzle applications wherein a smaller effective nozzle area is realized by increasing the combustion product flows.

In another more detailed embodiment in accordance with the embodiment of the FIGURE, apparatus 100 further comprises a second PDA 125 disposed adjacent aerodynamic surface 110 with a portion of separation control holes 130 communicating combustion product flows from second PDA 125 to aerodynamic surface 110 for modulating the separation. In some embodiments, combustion product flows from second PDA 125 serve to decrease the separation; in alternative embodiments, combustion product flows from second PDA 125 serve to increase the separation. For some applications, having both separation decreasing and separation increasing PDAs extends the range of operation of apparatus 100.

In another more detailed embodiment in accordance with the embodiment of the FIGURE, second PDA 125 operates out of phase with first PDA 120. Out of phase operation raises the frequency with which combustion product pulses are delivered to the boundary layer and, in some applications, produces a temporally more uniform boundary layer compared to operation with a single PDA.

In another more detailed embodiment in accordance with the embodiment of the FIGURE, apparatus 100 further includes a diffuser 140 for generating an adverse pressure gradient in a fluid flow. First pulse detonation actuator 120 extends along diffuser 140 and impulsively detonates a fuel/air mixture to produce a pressure rise and velocity increase of combustion products therein. For modulating separation of the fluid flow from aerodynamic surface 110, diffuser 140 has a number of separation control holes 130 for communicating combustion product flows from first PDA 120 to aerodynamic surface 110 of diffuser 140. Typical applications of diffuser 140 include, without limitation, gas turbine engines.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus comprising:
   a diffuser adapted for generating an adverse pressure gradient in a fluid flow;
   a first pulse detonation actuator extending along said diffuser and adapted for impulsively detonating a fuel/air mixture to produce a pressure rise and velocity increase of combustion products therein; and
   said diffuser having a plurality of separation control holes adapted for communicating combustion product flows from said first pulse detonation actuator to an aerodynamic surface of said diffuser for modulating separation of said fluid flow from said aerodynamic surface.

2. The apparatus of claim 1 further comprising a second pulse detonation actuator disposed adjacent said aerodynamic surface, said separation control holes being further adapted for communicating combustion product flows from said second pulse detonation actuator to said aerodynamic surface for modulating said separation.

3. An apparatus comprising:
   a diffuser adapted for generating an adverse pressure gradient in a fluid flow;
   a first pulse detonation actuator disposed adjacent said diffuser and adapted for impulsively detonating a fuel/air mixture to produce a pressure rise and velocity increase of combustion products therein;
   a second pulse detonation actuator disposed adjacent an aerodynamic surface of said diffuser, wherein said second pulse detonation actuator is adapted for operating out of phase with said first pulse detonation actuator; and
   said diffuser having a plurality of separation control holes adapted for communicating combustion product flows from said first pulse detonation actuator to said aerodynamic surface for modulating separation of said fluid flow from said aerodynamic surface, and
   said separation control holes being further adapted for communicating combustion product flows from said second pulse detonation actuator to said aerodynamic surface for modulating said separation.

4. A method comprising:
   generating an adverse pressure gradient in a fluid flow using an aerodynamic surface;
   impulsively detonating a first fuel/air mixture to produce a pressure rise and velocity increase of first combustion products adjacent said aerodynamic surface;
   communicating a plurality of first combustion product flows to said aerodynamic surface for modulating separation of said fluid flow from said aerodynamic surface;
   impulsively detonating a second fuel/air mixture to produce a pressure rise and velocity increase of second combustion products adjacent said aerodynamic surface; and
   communicating a plurality of second combustion product flows to said aerodynamic surface for modulating said separation, wherein impulsively detonating said first fuel/air mixture occurs out of phase with impulsively detonating said second fuel/air mixture.

5. A method comprising:
   diffusing a fluid flow using a diffuser to generate an adverse pressure gradient in said fluid flow;
   impulsively detonating a first fuel/air mixture to produce a pressure rise and velocity increase of first combustion products adjacent said diffuser;
   communicating a plurality of first combustion product flows to an aerodynamic surface of said diffuser for modulating separation of said fluid flow from said aerodynamic surface;
   impulsively detonating a second fuel/air mixture to produce a pressure rise and velocity increase of second combustion products adjacent said aerodynamic surface; and
   communicating a plurality of second combustion product flows to said aerodynamic surface for modulating said separation, wherein impulsively detonating said first fuel/air mixture occurs out of phase with impulsively detonating said second fuel/air mixture.

* * * * *

UNITED STATES PATENT AND TRADEMARK OFFICE
CERTIFICATE OF CORRECTION

PATENT NO. : 7,198,234 B2  Page 1 of 1
APPLICATION NO. : 11/029713
DATED : April 3, 2007
INVENTOR(S) : Seyed Gholamali Saddoughi et al.

It is certified that error appears in the above-identified patent and that said Letters Patent is hereby corrected as shown below:

Title Page, Item (74) Atty, Agent or Firm: Delete "DeCristofarc" and insert --DeCristofaro--.

Signed and Sealed this

Twenty-sixth Day of May, 2009

JOHN DOLL
*Acting Director of the United States Patent and Trademark Office*